US010353562B2

(12) United States Patent
Niemantsverdriet et al.

(10) Patent No.: US 10,353,562 B2
(45) Date of Patent: Jul. 16, 2019

(54) COMPUTER IMPLEMENTED METHOD FOR CREATING A DYNAMIC LIGHT EFFECT AND CONTROLLING A LIGHTING DEVICE ACCORDING TO THE DYNAMIC LIGHT EFFECT

(71) Applicant: SIGNIFY HOLDING B.V., Eindhoven (NL)

(72) Inventors: Karin Niemantsverdriet, Eindhoven (NL); Josephus Hubertus Eggen, Eindhoven (NL); Harm Van Essen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/089,584

(22) PCT Filed: Mar. 24, 2017

(86) PCT No.: PCT/EP2017/057091
§ 371 (c)(1),
(2) Date: Sep. 28, 2018

(87) PCT Pub. No.: WO2017/167662
PCT Pub. Date: Oct. 5, 2017

(65) Prior Publication Data
US 2019/0114062 A1    Apr. 18, 2019

(30) Foreign Application Priority Data

Mar. 31, 2016  (EP) ..................................... 16163093

(51) Int. Cl.
*G05F 1/00*       (2006.01)
*H05B 37/02*     (2006.01)
(Continued)

(52) U.S. Cl.
CPC ...... *G06F 3/04847* (2013.01); *G06F 3/04883* (2013.01); *H05B 37/0272* (2013.01)

(58) Field of Classification Search
None
See application file for complete search history.

(56) References Cited

U.S. PATENT DOCUMENTS

2008/0259590 A1   10/2008  De Goederen-Oei
2009/0122086 A1    5/2009  Diederiks et al.
(Continued)

FOREIGN PATENT DOCUMENTS

WO      2013121311 A1    8/2013
WO      2014027275 A1    2/2014

*Primary Examiner* — Anh Q Tran
(74) *Attorney, Agent, or Firm* — Akarsh P. Belagodu

(57) ABSTRACT

A controller (100) for creating a dynamic light effect and controlling a lighting device (120) according to the dynamic light effect, the controller comprising:
a user interface (104) for receiving user input,
a display unit (108),
a processor (106) for rendering, on the display unit (108), a graphical representation of the lighting device in an area of an image at a first position, the first position being associated with first color information, and for setting, upon receiving a first user input via the user interface (104), the graphical representation in a first state, wherein the graphical representation moves across the area of the image from the first position to a plurality of subsequent positions over a period of time, the plurality of subsequent positions being associated with subsequent color information, and for generating one or more lighting control commands (110) based on the first color information and the subsequent color information, and
a communication unit (102) for communicating the generated one or more lighting control commands (110) to (Continued)

the lighting device (120), so as to control the light output of the lighting device (120) according to the first color information and the subsequent color information subsequently over the period of time. A corresponding computer implemented method for for creating a dynamic light effect is also claimed.

14 Claims, 6 Drawing Sheets

(51) Int. Cl.
| | |
|---|---|
| *H05B 39/04* | (2006.01) |
| *H05B 41/39* | (2006.01) |
| *G06F 3/0484* | (2013.01) |
| *G06F 3/0488* | (2013.01) |

(56) References Cited

U.S. PATENT DOCUMENTS

| | | | |
|---|---|---|---|
| 2013/0271004 A1 | 10/2013 | Min et al. | |
| 2015/0022123 A1* | 1/2015 | Van De Sluis | .... H05B 37/0245 |
| | | | 315/312 |
| 2018/0324921 A1* | 11/2018 | Aliakseyeu | ........ H05B 33/0863 |

* cited by examiner

COMPUTER IMPLEMENTED METHOD FOR CREATING A DYNAMIC LIGHT EFFECT AND CONTROLLING A LIGHTING DEVICE ACCORDING TO THE DYNAMIC LIGHT EFFECT

CROSS-REFERENCE TO PRIOR APPLICATIONS

This application is the U.S. National Phase application under 35 U.S.C. § 371 of International Application No. PCT/EP2017/057091, filed on Mar. 24, 2017, which claims the benefit of European Patent Application No. 16163093.4, filed on Mar. 31, 2016. These applications are hereby incorporated by reference herein.

FIELD OF THE INVENTION

The invention relates to a computer implemented method for creating a dynamic light effect and controlling a lighting device according to the dynamic light effect. The invention further relates to a computer program product for performing the method. The invention further relates to a controller for creating a dynamic light effect and controlling a lighting device according to the dynamic light effect.

BACKGROUND

Future and current home and professional environments will contain a large number of lighting devices for creation of ambient, atmosphere, accent or task lighting. These controllable lighting devices may be controlled via a user interface of a remote control device, for example a smartphone, via a (wireless) network. An example of such a user interface is disclosed in patent application WO 2013121311 A1, which discloses a remote control unit that comprises a user interface through which a user may identify an area in an image and select a light source. The identified image area is linked with the light source and color information of the identified image area is transmitted to the light source. The light source is thereby enabled to adapt its light output to the color information. A user is thereby enabled to pick the color to be outputted by the light source by selecting an area in the image displayed on the remote control unit. This allows the user to create a static light effect. However, many users also desire to create dynamic light effects. A dynamic light effect comprises a plurality of light settings that change over time when applied to a (set of) lighting device(s). Thus, there is a need in the art for a user interface which allows a user to create a dynamic light effect.

SUMMARY OF THE INVENTION

It is an object of the present invention to provide a user interface for creating a dynamic light effect.

According to a first aspect of the present invention, the object is achieved by a computer implemented method for creating a dynamic light effect and controlling a lighting device according to the dynamic light effect, the computer implemented method comprising:
rendering a graphical representation of the lighting device in an area of an image at a first position, the first position being associated with first color information, which first color information is defined by one or more pixels of the image located at the first position,
receiving a first user input,
setting, upon receiving the first user input, the graphical representation in a movement state, wherein the graphical representation moves autonomously across the area of the image from the first position to a plurality of subsequent positions over a period of time, the plurality of subsequent positions being associated with subsequent color information, which subsequent color information is defined by one or more pixels of the image located at the respective subsequent position,
generating one or more lighting control commands based on the first color information and the subsequent color information,
communicating the generated one or more lighting control commands to the lighting device, so as to control the light output of the lighting device according to the first color information and the subsequent color information subsequently over the period of time.

By providing the first user input, the graphical representation of the lighting device starts moving across the area of the image (for example across the full image, or across a part of the image), whereupon the lighting device is (sequentially) controlled according to the colors of one or more pixels at the location of the graphical representation. This provides the advantage that it allows a user to create a dynamic light effect, simply by providing a user input to set the graphical representation in motion.

In an embodiment of the computer implemented method, the computer implemented method further comprises:
receiving, at a moment in time, a second user input when the graphical representation is in the movement state,
setting, upon receiving the second user input, the graphical representation in a stable state, wherein the graphical representation remains positioned at a stable position where it is located at the moment in time, and
controlling the light output of the lighting device according to subsequent color information associated with the stable position.

This embodiment enables a user to stop the movement of the graphical representation by providing a user input, whereupon the lighting device is controlled according to the color of one or more pixels at the stable position. This embodiment is advantageous because it enables a user select a static light setting when the dynamic light effect is no longer desired.

In an embodiment of the computer implemented method, the graphical representation moves according to a speed and a direction when the graphical representation is set in the movement state, wherein the speed and/or the direction are dependent on the first user input. The first user input may be provided by, for example, a swipe gesture (e.g. a selection of the graphical representation followed by a finger movement in a direction) on a touch sensitive display unit, and the speed and/or the direction may be determined based on the speed and/or the direction, respectively, of the swipe gesture. This is beneficial because it allows a user to control how the graphical representation moves across the area of the image, and therewith how the lighting device is controlled.

In an embodiment of the computer implemented method, the computer implemented method further comprises:
receiving a third user input indicative of an adjustment of the size and/or the shape of the area, and
adjusting the size and/or the shape of the area based on the third user input, wherein the graphical representation moves across the adjusted area.

This embodiment enables the user to adjust the size and/or the shape of the area wherein the graphical representation of the lighting device moves. This is beneficial because it allows a user to select the color palette (i.e. the colors of the area in the image), according to which the lighting device will be controlled.

In an embodiment of the computer implemented method, the computer implemented method further comprises:

providing one or more images,
receiving a fourth user input indicative of a selection of one of the one or more images,
replacing the image by the selected image.

This embodiment enables a user to replace the image by another image, which is beneficial because it provides further control options for the dynamic light effect.

According to a second aspect of the present invention, the object is achieved by a computer program product for a computing device, the computer program product comprising computer program code to perform the method of any one of the above-mentioned computer implemented methods when the computer program product is run on a processor of the computing device.

According to a third aspect of the present invention, the object is achieved by a controller for creating a dynamic light effect and controlling a lighting device according to the dynamic light effect, the controller comprising:

a user interface for receiving user input,
a display unit,
a processor for rendering, on the display unit, a graphical representation of the lighting device in an area of an image at a first position, the first position being associated with first color information, which first color information is defined by one or more pixels of the image located at the first position, and for setting, upon receiving a first user input via the user interface, the graphical representation in a movement state, wherein the graphical representation moves autonomously across the area of the image from the first position to a plurality of subsequent positions over a period of time, the plurality of subsequent positions being associated with subsequent color information, which subsequent color information is defined by one or more pixels of the image located at the respective subsequent position, and for generating one or more lighting control commands based on the first color information and the subsequent color information, and
a communication unit for communicating the generated one or more lighting control commands to the lighting device, so as to control the light output of the lighting device according to the first color information and the subsequent color information subsequently over the period of time.

By providing the first user input, the processor sets the graphical representation of the lighting device in the movement state, wherein it starts moving across the area of the image (for example across the full image, or across a part of the image), and whereupon the lighting device is (sequentially) controlled according to the colors of one or more pixels at the location of the graphical representation. This provides the advantage that it allows a user to create a dynamic light effect, simply by providing a user input via the user interface to set the graphical representation in motion.

In an embodiment of the controller, the display unit is a touch sensitive display unit, and the user interface is arranged for receiving the user input from the touch sensitive display unit. This embodiment allows a user to provide, for example, a swipe gesture as the first user input to set the graphical representation in motion. This is beneficial because it enables the user to provide a gesture with a direction and/or a speed, according to which the graphical representation may start moving.

In an embodiment of the controller, the user interface comprises a motion sensor arranged for sensing a movement of the controller, which movement is indicative of the user input. This embodiment allows a user to, for example, shake/reorient the controller so as to provide the first user input to set the graphical representation in motion. This is beneficial because it enables the user to provide move the controller in a direction and/or with a speed, according to which the graphical representation may start moving.

In an embodiment of the controller, the processor is arranged for controlling a speed and/or a direction of the graphical representation when the graphical representation is in the movement state based on the first user input. The first user input may be provided by, for example, a swipe gesture (e.g. a selection of the graphical representation followed by a finger movement in a direction) on a touch sensitive display unit, or by a movement of the first device, and the speed and/or the direction may be determined based on the speed and/or the direction, of the swipe gesture or the movement, respectively. This is beneficial because it allows a user to control how the graphical representation moves across the area of the image, and therewith how the lighting device is controlled.

In an embodiment of the controller, the user interface is further arranged for receiving a third user input indicative of an adjustment of the size and/or the shape of the area, and the processor is further arranged for adjusting the size and/or the shape of the area based on the third user input. This embodiment enables the user to adjust the size and/or the shape of the area wherein the graphical representation of the lighting device moves. This is beneficial because it allows a user to select the color palette (i.e. the colors of the area in the image), according to which the lighting device will be controlled.

In an embodiment of the controller, the user interface is further arranged for receiving a fourth user input indicative of a selection of one of a plurality of images, and wherein the processor is further arranged for replacing the image by the selected image upon receiving the fourth user input. This embodiment enables a user to replace the image by another image, which is beneficial because it provides further control options for the dynamic light effect.

In an embodiment of the controller, the user interface is further arranged for receiving a fifth user input indicative of a repositioning of the graphical representation, and wherein the processor is arranged for moving the graphical representation from a first area to a second area in the image upon receiving the fifth user input. This embodiment allows a user to determine in which area a graphical representation moves. In an embodiment, wherein multiple graphical representations are rendered, repositioning of graphical representations allows a user to create groups of graphical representations in specific areas. This results that all graphical representations in the same are (and therewith in the same group) are controlled according to the same color palette (i.e. the colors of the area in the image).

BRIEF DESCRIPTION OF THE DRAWINGS

The above, as well as additional objects, features and advantages of the disclosed methods and controllers, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
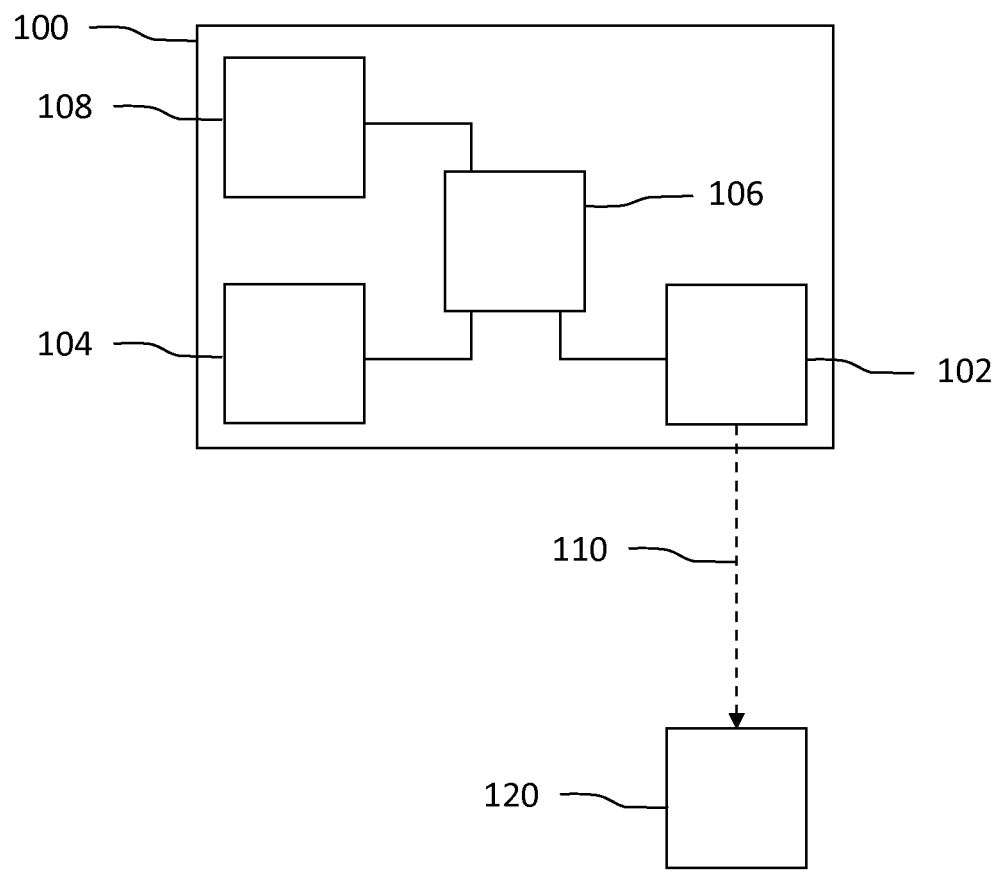
FIG. 1 shows schematically an embodiment of a controller according to the invention for creating a dynamic light effect and controlling a lighting device according to the dynamic light effect.

FIG. 1 shows schematically an embodiment of a controller 100 according to the invention for creating a dynamic light effect and controlling a lighting device 120 according to the dynamic light effect. The controller 100 comprises a user interface 104 for receiving user input and a display unit 108 for displaying an image 202. The controller 100 further comprises a processor 106 for rendering, on the display unit 108, a graphical representation 204 of the lighting device 120 in an area of the image at a first position, the first position being associated with first color information, and for setting, upon receiving a first user input via the user interface 104, the graphical representation 204 in a movement state, wherein the graphical representation 204 moves across the area of the image 202 from a first position 204 to a plurality of subsequent positions 204', 204" over time, the plurality of subsequent positions being associated with subsequent color information. The processor is further arranged for generating one or more lighting control commands 110 based on the first color information and the subsequent color information. The controller 100 further comprises a communication unit 102 for communicating the one or more lighting control commands 110 to the lighting device 120, so as to control the light output of the lighting device 120 according to the first color information and the subsequent color information subsequently over the period of time.

The controller 100 may be any type of control device arranged for communicating with light sources/lighting devices 120. The controller 100 may be a smart device, such as a smartphone or a tablet, or the controller 100 may be a wearable device, such as smart glasses or a smart watch. Alternatively, the controller 100 may be comprised in a building automation system, be comprised in a lighting device, luminaire, etc. The communication unit 102 of the controller 100 is arranged for communicating with the lighting device 120. The communication unit 102 may be arranged for communicating with the lighting device 120 directly, or via any intermediate device (such as a hub, a bridge, a proxy server, etc.). The communication unit 102 may transmit lighting control commands (for example as signals, messages, data packets, etc., comprising lighting control instructions to change the color, saturation and/or brightness of the light output of the lighting device 120) to a receiver of the lighting device 120 in order to control the light output of the lighting device 120 according to the first color information and the subsequent color information subsequently over the period of time. In embodiments, the communication unit 102 may be further arranged for receiving signals/messages/data packets from the lighting device 120. These received signals/messages/data packets may, for example, relate to an (active) light setting of the lighting device 120, the type of lighting device 120, the properties of the lighting device 120, etc. The communication unit 102 may transmit/receive messages, signals or data packets via any communication protocol (e.g. Wi-Fi, ZigBee, Bluetooth, 3G, 4G, LTE, DALI, DMX, USB, power over Ethernet, power-line communication, etc.). It may be beneficial if the controller 100 is arranged for communicating via a plurality of communication channels/protocols, thereby enabling the transmission/reception of messages, signals or data packets to/from a plurality of types of lighting devices 120.

The lighting device 120 may be any type of lighting device arranged for receiving lighting control commands 110. The lighting device 120 may comprise an LED light source, an incandescent light source, a fluorescent light source, a high-intensity discharge light source, etc. The lighting device 120 may be arranged for providing general lighting, task lighting, ambient lighting, atmosphere lighting, accent lighting, indoor lighting, outdoor lighting, etc. The lighting device 120 may be installed in a luminaire or in a lighting fixture. Alternatively, the lighting devices may be portable lighting devices (e.g. a hand-sized device, such as an LED cube, an LED sphere, etc.) or wearable lighting devices (e.g. a light bracelet, a light necklace, etc.).

Figure 2:
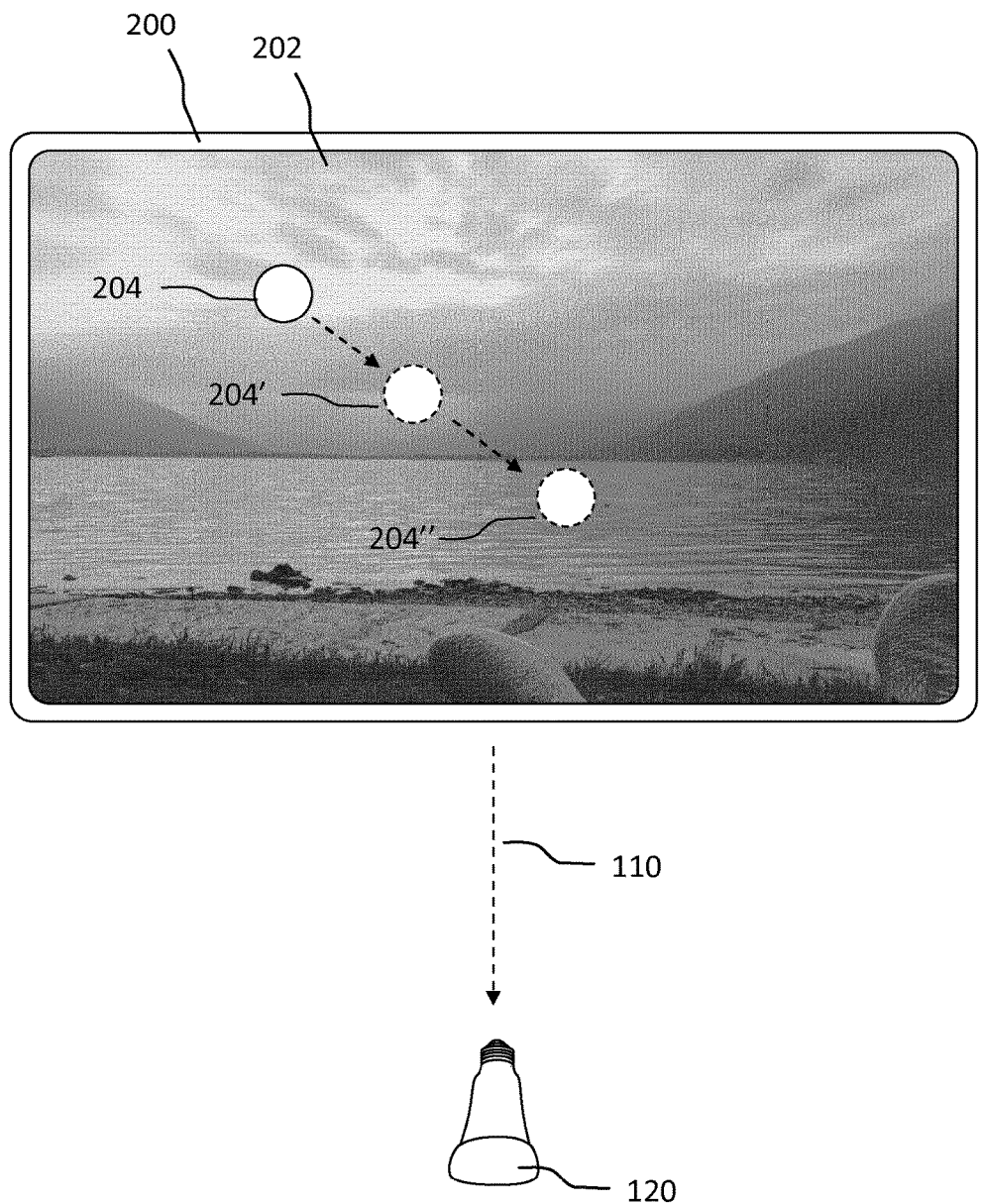
FIG. 2 shows an example of a graphical representation moving of a lighting device across an image.

The processor 106 (a microchip, circuitry, a microcontroller, etc.) is arranged for rendering the graphical representation 204 of the lighting device 120 in the area of the image at the first position. FIG. 2 illustrates an example of the graphical representation 204 in the area, which, in the example of FIG. 2, covers the full image 202. The first position of the graphical representation 204 is associated with first color information. The first color information may, for example, be defined by an average color value of pixels at the position of the graphical representation 204, an average color value of pixel values associated with the area covered by the graphical representation 204, a color value of a single pixel located at, for example, the center of the graphical representation 204, etc. The processor 106 is further arranged for setting, upon receiving the first user input via the user interface 104, the graphical representation 204 in a movement state, wherein the graphical representation 204 moves across the area of the image from the first position to a plurality of subsequent positions 204', 204" over a period of time. FIG. 2 illustrates an example of such a movement of the graphical representation 204 from the first position (204) to a plurality of subsequent positions 204' and 204". The subsequent positions 204', 204" of the graphical representation 204 are associated with subsequent color information. The subsequent color information may, for example, be defined by an average color value of pixels at the position of the graphical representation at one of the subsequent positions 204', 204", an average color value of pixel values associated with the area covered by the graphical representation at one of the subsequent positions 204', 204", a color value of a single pixel located at, for example, the center of the graphical representation at one of the subsequent positions 204', 204", etc.

The processor 106 is further arranged for generating one or more lighting control commands 110 based on the first color information and the subsequent color information. The processor may, for example, generate a first lighting control command at a first moment in time when the graphical representation 204 is at the first position (204) based on the color information of that position (for example a white color of the clouds in the image in FIG. 2), generate a second lighting control command at a second moment in time when the graphical representation 204' is at a second position (204') based on the color information of that position (for example a blue-grey color of the darker clouds in the image in FIG. 2) and generate a third lighting control command at a third moment in time when the graphical representation 204" is at a third position (204") based on the color information of that position (for example a blue color of the water in the image in FIG. 2). The communication unit 102 may communicate the first, second and third lighting control commands at the first, second and third moment in time, respectively, to the lighting device 120. As such, the light output of the lighting device 120 is controller according to the first color information and the subsequent color information subsequently over the period of time. Alternatively, the communication unit 102 may wait for a short period of time before communicating the one or more lighting control commands 110, and communicate multiple pieces of color information at once, whereupon the lighting device may determine (e.g. by interpolating) the colors in between the multiple pieces of color information. This may be advantageous when the system is applied in a network structure wherein less data communication is desired.

The controller 100 further comprises a display unit 108 arranged for displaying the image and the graphical representation, which allows a user to see the image and the movement of the graphical representation.

The display unit 108 of the controller 100 may comprise a touch sensitive surface as the user interface 104, the touch sensitive surface being arranged for receiving user input. The touch sensitive surface may be arranged for receiving the user input, for example the first input to set the graphical representation in the movement state, wherein it moves across the area of the image from the first position to the plurality of subsequent positions over the period of time. Additionally or alternatively, the user interface 104 may comprise a pointing device, such as a computer mouse or a stylus pen, which may be operated by the user in order to provide the user input. Additionally or alternatively, the user interface 104 may for example comprise an audio sensor such as a microphone, a motion sensor such as an accelerometer, magnetometer and/or a gyroscope for detecting movements (or gestures), a camera for detecting gestures and/or one or more buttons for receiving the user input.

The processor 106 may be further arranged for determining the speed and/or the direction of the movement of the graphical representation based on a user input. The user interface 104 may be further arranged for receiving, at a moment in time, a second user input when the graphical representation is in the movement state. The processor 106 may set, upon receiving the second user input, the graphical representation in a stable state, wherein the graphical representation remains positioned at a stable position where it is located at the moment in time. The processor 106 may be further arranged for generating a lighting control command based on subsequent color information associated with the stable position. When the graphical representation is in the stable state, the user may provide another user input (the first user input), whereupon the processor 106 may set the graphical representation back to the movement state, wherein the graphical representation starts moving across the area in the image again. This process may be repeated by the user, which is advantageous because it allows the user to set the dynamic light effect and, when the light output of the lighting device 120 is as desired, the user can set a static light effect.

The processor 106 may be arranged for determining the speed and/or the direction of the movement of the graphical representation 204. The speed and/or the direction may be determined randomly, may be predetermined, may be predefined by a user, may be based on a user input, may be adjustable based on a user input, etc. The speed of the movement may be constant or inconstant and/or it may decrease over time. The processor 106 may be further arranged for determining the path of the movement of the graphical representation 204. The path may be linear, the path may be curved, circular, looped, etc. The processor 106 may be further arranged for determining the graphical representation's path when it moves towards an edge of the area. The processor 106 may calculate the angle of reflection based on, for example, the angle of incidence of the graphical representation (the angle of incidence being the angle between the path incident on the edge of the area and an imaginary line perpendicular to the edge of the area). Alternatively, the processor 106 may generate a random angle of reflection, or determine the angle of reflection on any other parameter. Alternatively, the graphical representation 204 may exit the area on one edge of the area and enter the area at another edge of the area.

The processor 106 may be arranged for controlling the speed and/or the direction of the graphical representation when the graphical representation is in the movement state based on the first user input. In an embodiment, the user interface 104 may, for example, comprise a touch sensitive display for receiving a touch input which is indicative of the first user input. The processor 106 may, for example, be arranged for determining the speed based on the speed of a swipe input provided by the user, based on the amount of pressure provided by the user, based on the duration of the touch input, etc. Additionally or alternatively, the processor 106 may be arranged for determining the direction based on the direction of a swipe input provided by the user. In another embodiment, the user interface 104 may comprise a motion sensor (e.g. an accelerometer, a gyroscope, a magnetometer, etc.) arranged for sensing a movement of the controller 100, which movement is indicative of the user input. The processor 106 may be arranged for determining the speed and/or the direction of the graphical representation based on the movement of the controller 100. A user may, for example, tilt/reorient the controller 100, which tilt may be indicative of the direction (direction of the tilt) and the speed (angle of inclination). Alternatively, a user may shake the controller 106, which shaking movement may be indicative of a random speed and random direction of the movement of the graphical representation.

Figure 3A:
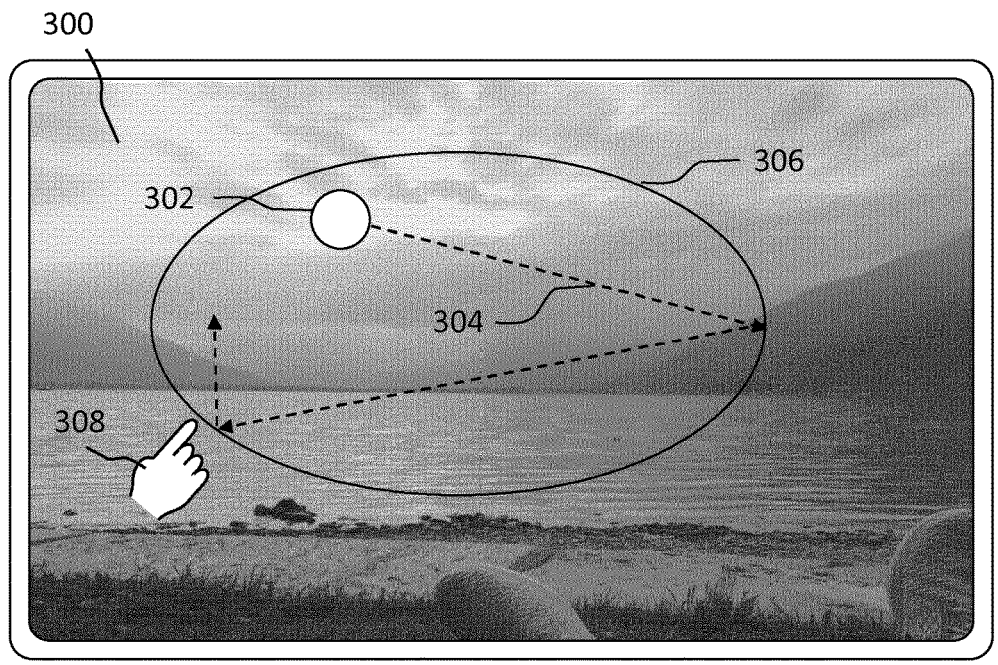
FIG. 3a shows an example of a graphical representation of a lighting device moving across a demarcated area in an image.

FIG. 3a shows an example of a graphical representation 302 of a lighting device moving across a demarcated area 306 in an image 300. The graphical representation 302 moves in direction 304, and, when it encounters the edge of the demarcated area 306, it moves in a different direction. Thus, the graphical representation stays within the borders of the demarcated area 306, and the processor (not shown)

generates lighting control commands based on the colors on the path 304 of the graphical representation 302, which lighting control commands are communicated to the lighting device so as to control the light output of the lighting device according to the color information on the path over a period of time.

Figure 3B:
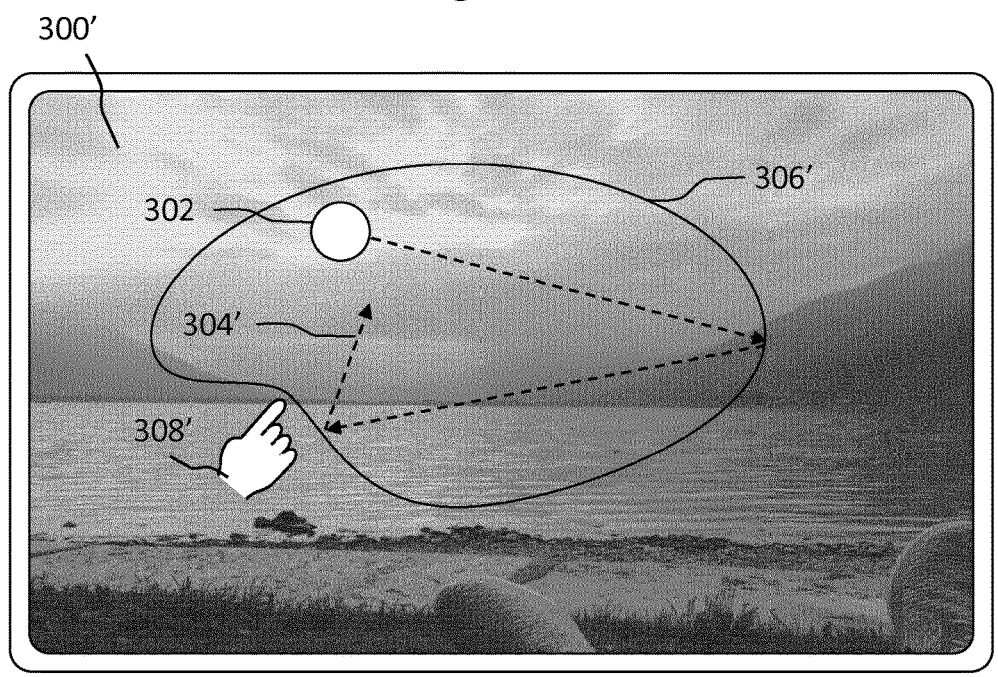
FIG. 3b shows an example of an adjustment of a demarcated area in an image.

The user interface 104 may be further arranged for receiving user input indicative of an adjustment of the size and/or the shape of the area. The processor 106 may be further arranged for adjusting the size and/or the shape of the area based on the third user input. FIGS. 3a and 3b show an example of a user input 308, 308' indicative of an adjustment of the size and/or the shape of the area 306, 306'. A user may, for example, select 308 one or more edges of the demarcated area 306 and 'move' 308' the edge, whereupon the processor may move, or as illustrated in FIG. 3b, adjust the shape of the demarcated area 306'. This results in an adjusted shape of the demarcated area 306', and therewith an adjusted path 304' of the graphical representation 302. The processor (not shown) generates lighting control commands based on the colors on the path 304' of the graphical representation 302, which lighting control commands are communicated to the lighting device so as to control the light output of the lighting device according to the color information on the path over a period of time. Additionally or alternatively, the user may use two fingers to select the demarcated area 306 on the display and 'pinch' to adjust the size of the demarcated area 306. Additionally or alternatively, the user input may be indicative of the shape of the area. A user may, for example, 'draw' the shape of the area directly on the image (for example on a touch screen). It should be noted that the above-mentioned ways of adjusting and/or creating the area are merely examples, and that a skilled person will be able to design many alternatives without departing from the scope of the appended claims.

Figure 4A:
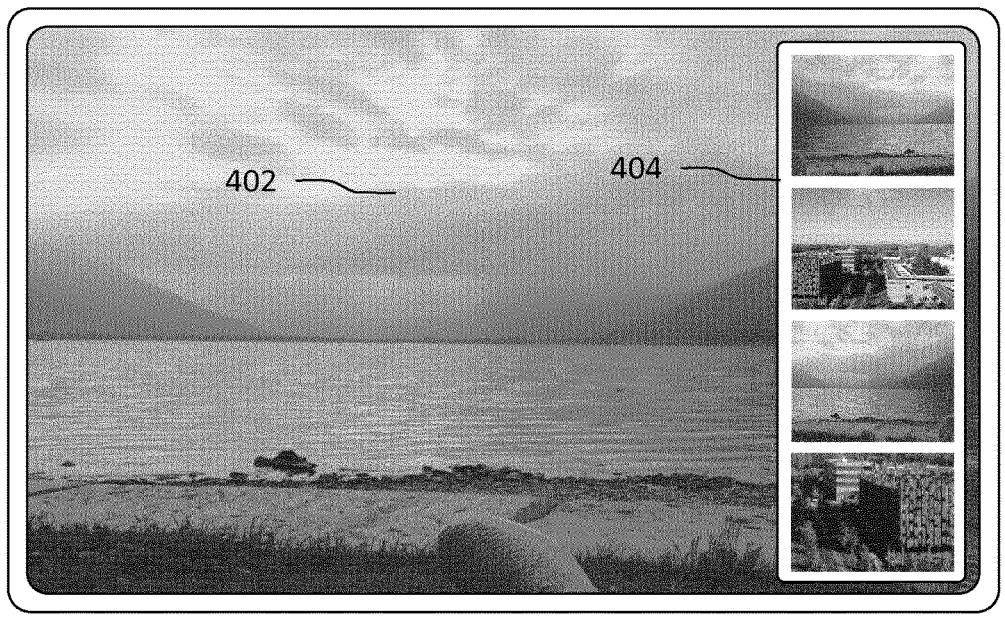
FIG. 4a shows an example of a user interface for selecting an image.

The user interface 104 may be further arranged for receiving user input indicative of a selection of one of a plurality of images, and the processor 106 may be further arranged for replacing the image by the selected image upon receiving the fourth user input. FIG. 4a illustrates an example of a user interface 404 for receiving user input for selecting the image. The images may be stored in a memory, and the processor 106 may be further arranged for accessing the memory, retrieving the images and displaying the images on the display unit 108 of the controller. The user interface may, for example, comprise a touch sensitive display for receiving a touch input which is indicative of a selection of an image 402.

Figure 4B:
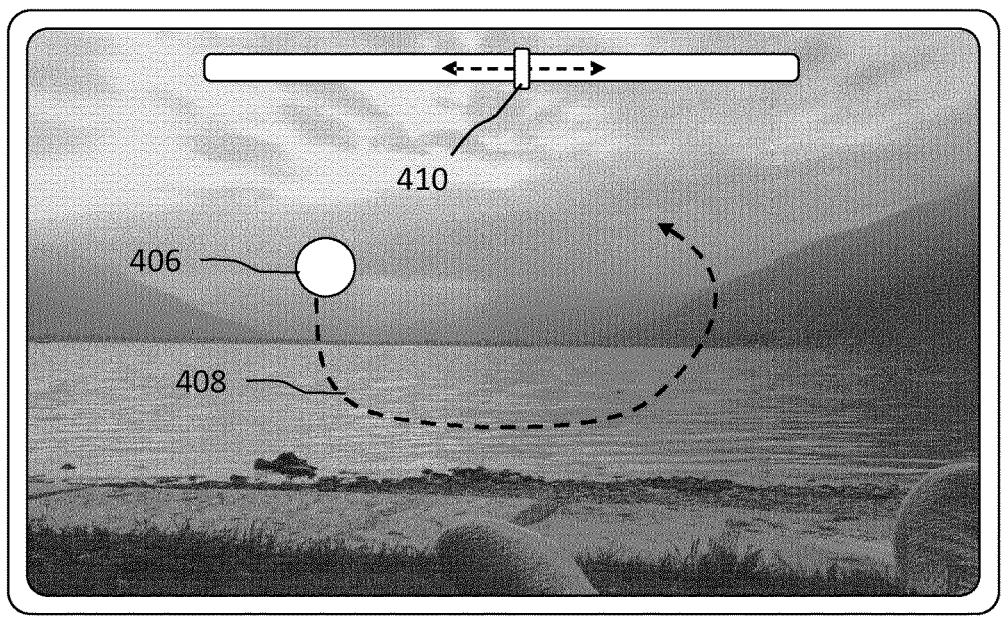
FIG. 4b shows an example of a user interface for adjusting the speed of a moving graphical representation of a lighting device.

FIG. 4b shows an example of a user interface for adjusting the speed of a moving graphical representation 408 of a lighting device. The user interface comprises a slider 410, which may be moved (for example by providing a touch input via a touchscreen) to increase or decrease the speed of the movement of the graphical representation 406 along the path 408.

Figure 5A:
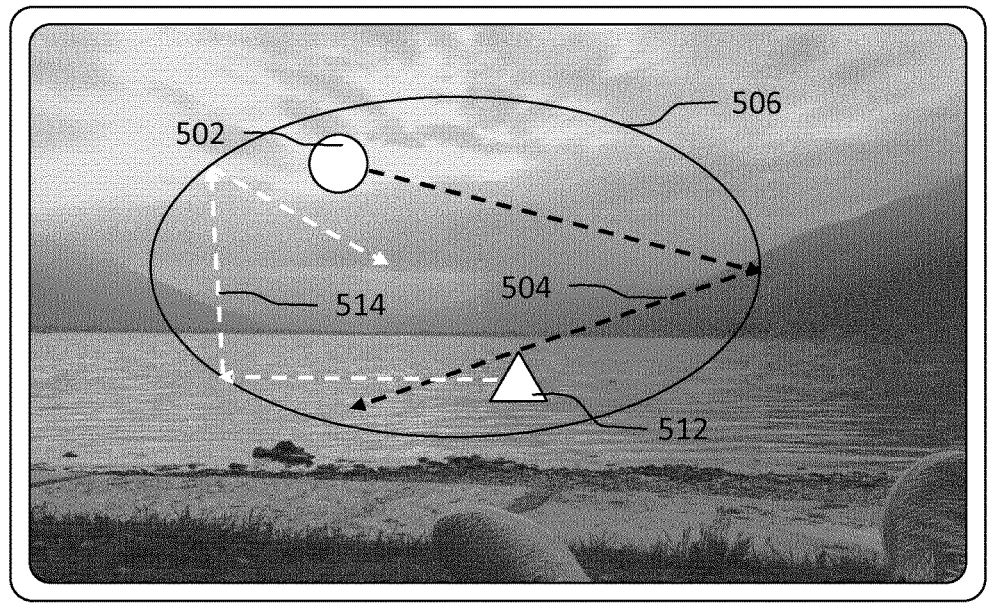
FIG. 5a shows an example of a plurality of graphical representations moving of a plurality of lighting devices across an image.

The controller 100 may be arranged for controlling a plurality of lighting devices. The lighting devices may be controlled according to one dynamic lighting effect or according to a plurality of dynamic lighting effects. FIG. 5a illustrates an example of a display rendering a first graphical representation 502 and a second graphical representation 512, which move, when set to the movement state, along a first path 504 and a second path 514, respectively in an area 506 of the image. The processor (not shown) generates lighting control commands for the first and second lighting device based on the colors of the positions of the graphical representations 502, 512 on the path, which lighting control commands are communicated to the lighting devices by the communication unit so as control to the light output of the lighting device according to the color information on the path over a period of time.

Figure 5B:
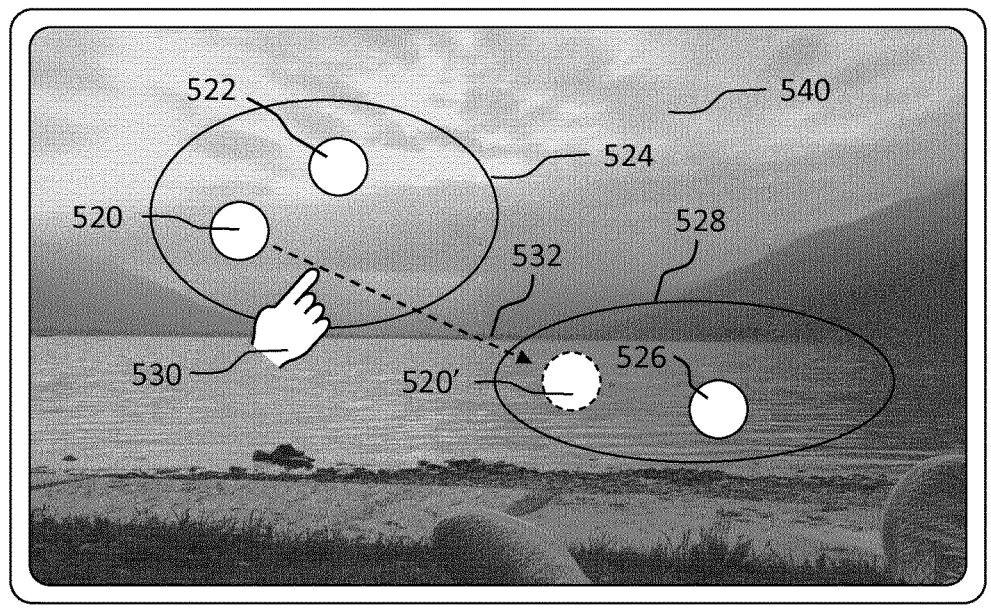
FIG. 5b shows an example of a user interface for moving a graphical representation of a lighting device from a first area to a second area.

The user interface 104 may be further arranged for receiving user input indicative of a repositioning of the graphical representation. The processor 106 may be further arranged for moving the graphical representation from a first area to a second area in the image upon receiving the user input. FIG. 5b illustrates an example of a repositioning 532 of a graphical representation 520, 520' of a lighting device. FIG. 5b illustrates a first area 524 comprising a first graphical representation 520 of a first lighting device and a second graphical representation 522 of a second lighting device, and a second area 528 comprising a third graphical representation 526 of a third lighting device. A user may provide a user input 530 (for example a touch input) to move (drag) 532 the first graphical representation 520 from the first area 524 to the second area, whereupon the first graphical representation 520' may be set to a movement state wherein it moves across the second area 528 within its boundaries. The processor (not shown) generates lighting control commands for the first, second and third lighting device based on the colors of the positions of the graphical representations 520, 522, 526, respectively, which lighting control commands are communicated to the lighting devices by the communication unit so as control to the light output of the lighting device according to the color information on the path over a period of time. In the example of FIG. 5b, the graphical representation 520 is moved from the first demarcated area 524 to the second demarcated area 528, but the graphical representation may also be moved to the area 540 outside the demarcated area.

Figure 6:
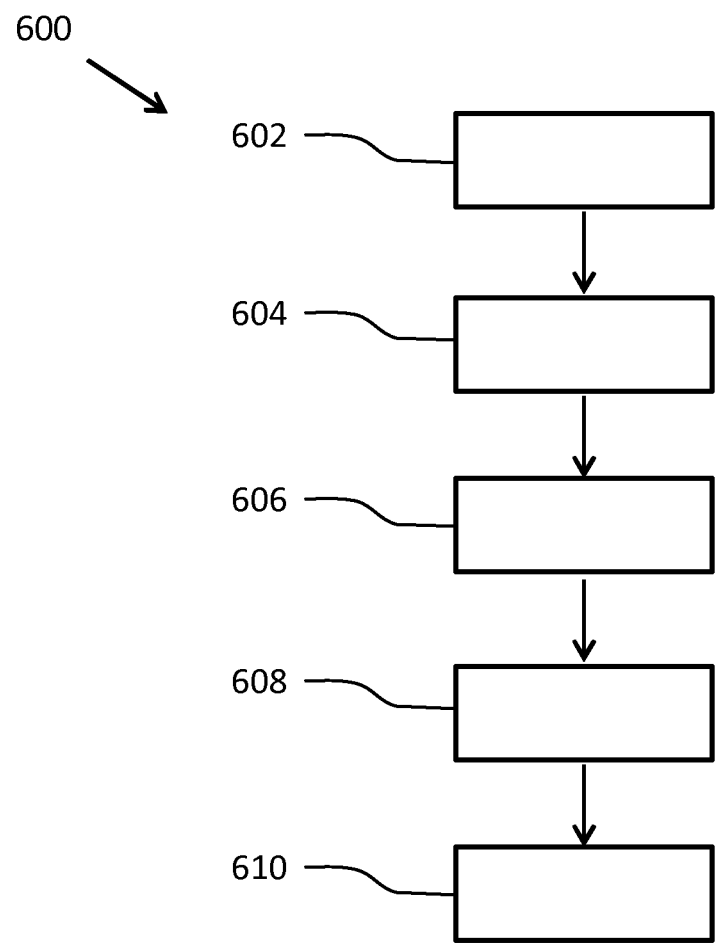
FIG. 6 shows schematically a method according to the invention for creating a dynamic light effect and controlling a lighting device according to the dynamic light effect.

FIG. 6 shows schematically a computer implemented method 600 according to the invention for creating a dynamic light effect and controlling a lighting device according to the dynamic light effect. The method 600 comprises the steps of:

rendering 602 a graphical representation of the lighting device in an area of an image at a first position, the first position being associated with first color information, receiving 604 a first user input, setting 606, upon receiving the first user input, the graphical representation in a movement state, wherein the graphical representation moves across the area of the image from the first position to a plurality of subsequent positions over a period of time, the plurality of subsequent positions being associated with subsequent color information, generating 608 one or more lighting control commands based on the first color information and the subsequent color information, communicating 110 the generated one or more lighting control commands to the lighting device, so as to control the light output of the lighting device according to the first color information and the subsequent color information subsequently over the period of time. The steps of the computer implemented method may be executed by a computer program running on the processor 106 of the controller 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processor. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A computer implemented method for creating a dynamic light effect and controlling a lighting device according to the dynamic light effect, the computer implemented method comprising:
   rendering a graphical representation of the lighting device in an area of an image at a first position, the first position being associated with first color information, which first color information is defined by one or more pixels of the image located at the first position,
   receiving a first user input,
   setting, upon receiving the first user input, the graphical representation in a movement state, wherein the graphical representation moves autonomously across the area of the image from the first position to a plurality of subsequent positions over a period of time, the plurality of subsequent positions being associated with subsequent color information, which subsequent color information is defined by one or more pixels of the image located at the respective subsequent position,
   generating one or more lighting control commands based on the first color information and the subsequent color information,
   communicating the generated one or more lighting control commands to the lighting device, so as to control the light output of the lighting device according to the first color information and the subsequent color information subsequently over the period of time.

2. The computer implemented method of claim 1 further comprising:
   receiving, at a moment in time, a second user input when the graphical representation is in the movement state,
   setting, upon receiving the second user input, the graphical representation in a stable state, wherein the graphical representation remains positioned at a stable position where it is located at the moment in time, and
   controlling the light output of the lighting device according to subsequent color information associated with the stable position.

3. The computer implemented method of claim 1, wherein the graphical representation moves according to a speed and a direction when the graphical representation is set in the movement state, wherein the speed and/or the direction are dependent on the first user input.

4. The computer implemented method of claim 1, further comprising:
   receiving a third user input indicative of an adjustment of the size and/or the shape of the area, and
   adjusting the size and/or the shape of the area based on the third user input, wherein the graphical representation moves across the adjusted area.

5. The computer implemented method of claim 1, further comprising:
   providing a plurality of images,
   receiving a fourth user input indicative of a selection of one of the plurality of images,
   replacing the image by the selected image.

6. A computer program product for a computing device, the computer program product comprising computer program code to perform the method of claim 1 when the computer program product is run on a processor of the computing device.

7. A controller for creating a dynamic light effect and controlling a lighting device according to the dynamic light effect, the controller comprising:
   a user interface for receiving user input,
   a display unit,
   a processor for rendering, on the display unit, a graphical representation of the lighting device in an area of an image at a first position, the first position being associated with first color information, which first color information is defined by one or more pixels of the image located at the first position, and for setting, upon receiving a first user input via the user interface, the graphical representation in a movement state, wherein the graphical representation moves autonomously across the area of the image from the first position to a plurality of subsequent positions over a period of time, the plurality of subsequent positions being associated with subsequent color information, which subsequent color information is defined by one or more pixels of the image located at the respective subsequent position, and for generating one or more lighting control commands based on the first color information and the subsequent color information, and
   a communication unit for communicating the generated one or more lighting control commands to the lighting device, so as to control the light output of the lighting device according to the first color information and the subsequent color information subsequently over the period of time.

8. The controller of claim 7, wherein the display unit is a touch sensitive display unit, and wherein the user interface is arranged for receiving the user input from the touch sensitive display unit.

9. The controller of claim 7, wherein the user interface comprises a motion sensor arranged for sensing a movement of the controller, which movement is indicative of the user input.

10. The controller of claim 7, wherein the user interface is arranged for receiving, at a moment in time, a second user input when the graphical representation is in the movement state, and wherein the processor is arranged for setting, upon receiving the second user input, the graphical representation in a stable state, wherein the graphical representation remains positioned at a stable position where it is located at the moment in time, and for generating a lighting control command based on subsequent color information associated with the stable position.

11. The controller of claim 7, wherein the processor is arranged for controlling a speed and/or a direction of the graphical representation when the graphical representation is in the movement state based on the first user input.

12. The controller of claim 7, wherein the user interface is further arranged for receiving a third user input indicative of an adjustment of the size and/or the shape of the area, and wherein the processor is further arranged for adjusting the size and/or the shape of the area based on the third user input.

13. The controller of claim 7, wherein the user interface is further arranged for receiving a fourth user input indicative of a selection of one of a plurality of images, and wherein the processor is further arranged for replacing the image by the selected image upon receiving the fourth user input.

14. The controller of claim 7, wherein the user interface is further arranged for receiving a fifth user input indicative of a repositioning of the graphical representation, and wherein the processor is arranged for moving the graphical representation from a first area to a second area in the image upon receiving the fifth user input.

* * * * *